United States Patent [19]

Arnaud

[11] 4,192,264
[45] Mar. 11, 1980

[54] APPARATUS FOR THE RECIRCULATION OF THE EXHAUST GASES OF INTERNAL COMBUSTION ENGINES

[75] Inventor: Henry Arnaud, La Ferte Alais, France

[73] Assignee: Regie Nationale des Usines Renault, Boulogne-Billancourt, France

[21] Appl. No.: 873,591

[22] Filed: Jan. 30, 1978

[30] Foreign Application Priority Data

Jan. 28, 1977 [FR] France ............................ 77 02386

[51] Int. Cl.² ........................................... F02M 25/06
[52] U.S. Cl. ................................................. 123/119 A
[58] Field of Search ..................................... 123/119 A

[56] References Cited

U.S. PATENT DOCUMENTS

| 3,802,402 | 4/1974 | Swatman | 123/119 A |
| 3,977,381 | 8/1976 | Fusikawa et al. | 123/119 A |
| 4,027,638 | 6/1977 | Moriya et al. | 123/119 A |
| 4,073,202 | 2/1978 | Aoyama et al. | 123/119 A |

FOREIGN PATENT DOCUMENTS 2136284  12/1972  France ............................ 123/119 A Primary Examiner—Wendell E. Burns
Attorney, Agent, or Firm—Oblon, Fisher, Spivak, McClelland & Maier

[57] ABSTRACT

An apparatus for recycling the exhaust gases of internal combustion engines for antipollution purposes, in particular oxides of nitrogen. A regulator valve is connected upstream of a main valve, the opening of which is controlled as a function of the air supply to the motor, in the conduit for recirculation of the exhaust gases and is controlled with respect to closure by the difference between the pressures upstream and downstream of the needle or valve of the main valve against a spring acting in the direction for opening the valve. Antipollution control in internal combustion engines is provided by the modulated recycling of exhaust gases.

9 Claims, 1 Drawing Figure

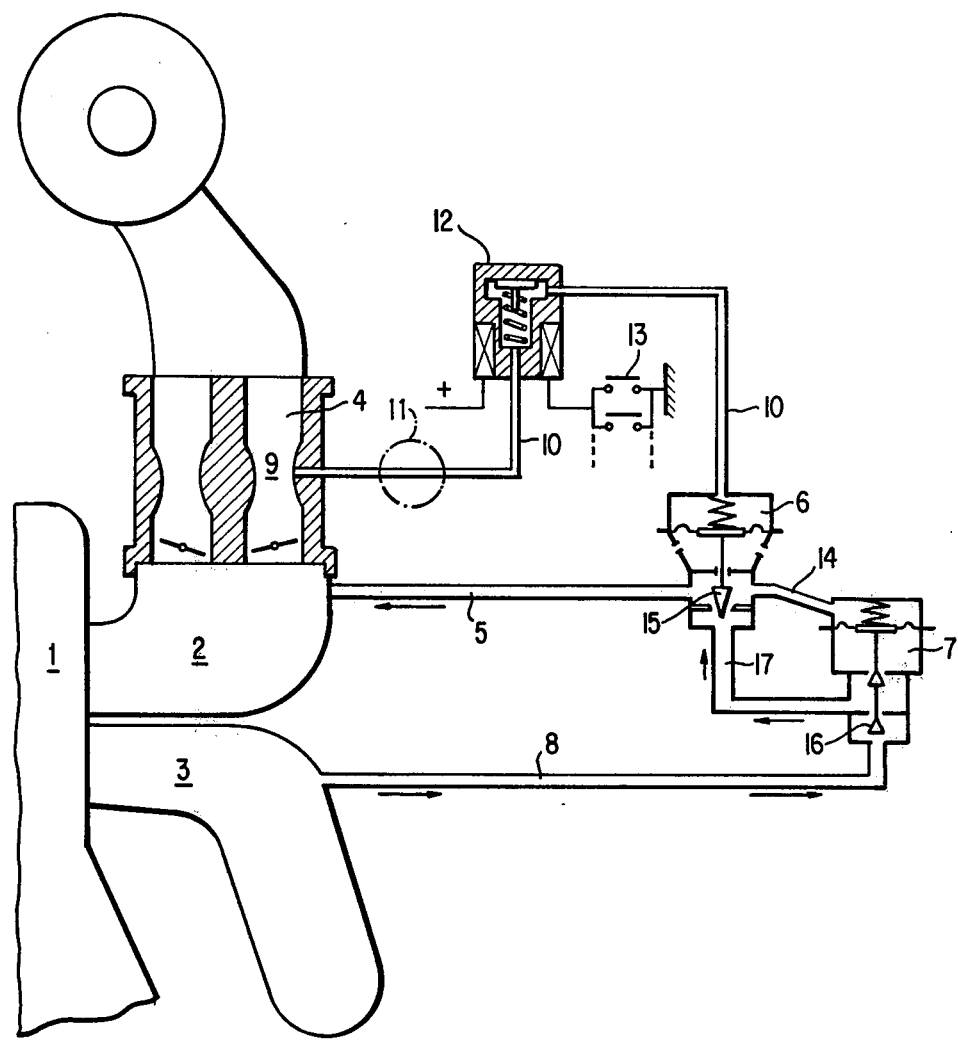

APPARATUS FOR THE RECIRCULATION OF THE EXHAUST GASES OF INTERNAL COMBUSTION ENGINES

BACKGROUND OF THE INVENTION

1. Field of the Invention

The present invention concerns an improvement in systems for recycling exhaust gases for antipollution purposes in internal combustion engines.

2. Description of the Prior Art

More and more severe restrictions on the emission of oxides of nitrogen in exhaust gases have led to general use of exhaust-gas recycling systems permitting attainment of high degrees of recycling over a wide range of operation.

In this connection, it is necessary in practice to adopt the degree of recycling of gases to the assimilation capacity of the motor to obtain the greatest reduction in oxides of nitrogen without adversely affecting motor operation prohibitively.

In most known systems the arrangement for control of recycling does not permit full exploitation of the possibilities of this method of treatment. The effectiveness of such systems is limited by the deterioration in motor operation at low loads and by the resultant increase in hydrocarbon emissions.

Actually, most often, the degree of recycling not only is not constant as a function of load, but even varies inversely with it, the opening of the regulating supply valve is controlled, in the most improved systems, by the motor air supply due to a pneumatic or mechanical linkage, but the recycled supply is likewise a function of the difference in pressure between the motor exhaust and intake, and thus of its loading.

In certain systems a correction is made in the opening of the valve or the difference in pressure upstream and downstream of the valve as a function of motor load, but they are complicated and do not appear to be commercially useful.

SUMMARY OF THE INVENTION

Accordingly, the object of the present invention is to take into account motor load and permits easy realization, with great reliability, of a regulation of the degree of recycling of gases as a function of the supply of air and the loading of the motor.

The system of the present invention includes a main valve controlled by the vacuum prevailing at the carburetor venturi, with auxiliary go, no-go (operational, non-operation) devices, e.g. an electrovalve for eliminating or discontinuing recycling under certain conditions of operation.

The adaptation of the supply of recycled gases as a function of the load is realized, according to the invention, by a second valve connected upstream of the main valve in the recirculation path; this valve being controlled in the closing direction by the action of the difference between the pressures upstream and downstream of the needle of the main valve against a spring acting in the direction of opening.

At low motor loads the vacuum prevailing in the intake manifold is elevated, the pressure prevailing downstream of the needle of the main valve is therefore low and the regulating valve will be driven toward closure, thus lowering the pressure upstream of the needle of the main valve until the force created by the pressures, prevailing upstream and downstream of the needle of the main valve, applied to the two sides of the diaphragm of the regulating valve, balances the reaction of the opposing spring.

Under heavy load, the vacuum in the intake manifold decreases, the pressure downstream of the needle of the regulating valve increases and the regulating valve is driven towards its open position.

The regulating valve thus controlled creates in the circuit a variable pressure loss in such a way that the main valve, controlled by the motor air supply, works with a practically constant pressure difference across its needle.

The domain of intervention of the system can be adapted to motor operating conditions, with precision, by judicious combination of the control parameters: active surface of the diaphragms, spring characteristics and shapes of the needles.

More precisely, the arrangement of the invention for recirculating the exhaust gases of internal combustion engines, including a main recirculation valve controlled in its opening as a function of engine air supply, is characterized by the fact that a regulating valve connected upstream of the main valve in the recirculation conduit is controlled in opening by the mutual action of the motor intake pressure and a spring and simultaneously in closure by the intermediate pressure between the needles of the main and regulating valves for recycling exhaust gases.

The regulating valve will preferably be a differential pneumatically controlled valve balanced between the pressure downstream of its needle and that downstream of the main valve needle.

BRIEF DESCRIPTION OF THE DRAWINGS

Various other objects, features and attendant advantages of the present invention will be more fully appreciated as the same becomes better understood from the following detailed description when considered in connection with the accompanying drawing wherein:

The FIGURE discloses the embodiment of the present invention.

DETAILED DESCRIPTION OF THE PREFERRED EMBODIMENT

The FIGURE shows a motor 1 with its intake manifold 2 and exhaust manifold 3. At the base of the carburetor 4 there opens into the intake passage 2 a conduit 5 for recycling exhaust gases, the supply of which is regulated by a main valve 6 upstream of which is connected a regulating valve 7 communicating with the exhaust passage 3 through a conduit 8.

The opening of the main valve 6 is controlled by the vacuum at the throat of the carburetor venturi 9 by way of a passage 10 which can contain, e.g., a pressure amplifier 11 (as shown in U.S. Pat. No. 3,739,797 and U.S. Pat. No. 3,861,642) and an electrovalve 12 controlled by a switch 13 the function of which is to cause closure of the main valve 6 by opening passage 10 to the atmosphere and to thus interrupt the recirculation of exhaust gases on the basis of indications of motor operation parameters, such as its temperature or the position of the carburetor throttle, etc.

The regulator valve 7, like the main valve 6, can be a pneumatic capsule type valve with diaphragm and spring controlling the opening or closure of a needle or valve 16 with its diaphragm subjected on one side to the intake pressure by a conduit 14 connected downstream of the needle or valve 15 of the main valve 6 and, on its other side, to the pressure prevailing inside the housing of valve 7 downstream of its needle 16 opening upstream into the passage 8 with the exhaust pressure.

The results from this arrangement is that the governing of the opening of the regulator valve 7 is by the action of increased intake pressure through conduit or passage 14 which causes a variation in the intermediate pressure in passage 17 between the needles 15 and 16 complementary to the difference between the intake and exhaust pressures so that the difference between intake pressure and this intermediate pressure is constant.

Thus, there is obtained a modulation of the supply of recycled exhaust gases as a function of motor load and air supply, with very simple means.

Obviously numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An apparatus for recirculation of the exhaust gases of internal combustion engines including a carburetor, intake manifold and exhaust manifold, for antipollution control, which comprises:
   a recirculation conduit interconnecting said exhaust manifold and said intake manifold;
   a main valve disposed in said recirculation conduit including a moveable member and a resilient member for biasing said moveable member in a closed position;
   a regulation valve connected to said recirculation conduit upstream of said main valve; and,
   means for controlling the opening of said main valve as a function of air supply to said engine and means for controlling the operation of said regulation valve as a function of the pressure differential between pressure upstream and downstream of said main valve moveable member such that supply of recycled gas from said exhaust manifold to said intake manifold is accomplished as a function of engine load.

2. An apparatus as set forth in claim 1, wherein:
   said means for controlling the operation of said regulation valve includes;
   a first passage member interconnecting an upstream side of said main valve moveable member with said regulation valve; and,
   a second passage member interconnecting the downstream side of said main valve moveable member with said regulation valve such that during a low engine load said regulation valve is directed towards a closed position and during a high engine load said regulation valve is directed towards an open position.

3. An apparatus as set forth in claim 1, wherein;
   said regulation valve further comprises a diaphragm member, a moveable member, and a resilient member for biasing said movable member in an open position.

4. An apparatus as set forth in claim 3, wherein;
   said moveable member comprises a needle and wherein said resilient member comprises a spring.

5. An apparatus as set forth in claim 1, which further comprises;
   means for discontinuing recycling of said exhaust gases interconnecting said carburetor and said main valve.

6. An apparatus as set forth in claim 2, which further comprises:
   means for discontinuing recycling of said exhaust gases interconnecting said carburetor and said main valve.

7. An apparatus as set forth in claim 5, said means for discontinuing recycling said exhaust gases comprising:
   a pressure amplifier interconnected with said carburetor;
   an electrovalve interconnecting said amplifier and said main valve for opening and closing said main valve; and
   switch means for controlling said electrovalve.

8. An apparatus as set forth in claim 6, said means for discontinuing recycling of said exhaust gases comprising:
   a pressure amplifier interconnected with said carburetor;
   an electrovalve interconnecting said amplifier and said main valve for opening and closing said main valve; and
   switch means for controlling said electrovalve.

9. An apparatus as set forth in claim 1, wherein:
   said means for controlling operation of said regulation valve includes;
   a first passage member interconnecting an upstream side of said main valve movable member with said regulation valve; and,
   a second passage member interconnecting the downstream side of said main valve movable member with said regulation valve such that during a low engine load said regulation valve is directed towards a closed position and during a high engine load said regulation valve is directed towards an open position;
   said apparatus further comprising:
   a pressure amplifier interconnected with said carburetor;
   an electrovalve interconnecting said amplifier and said main valve for opening and closing said main valve; and,
   switch means for controlling said electrovalve and for discontinuing recycling of said exhaust gases.

* * * * *